Patented Feb. 13, 1934

1,946,958

UNITED STATES PATENT OFFICE 1,946,958

WELDING ELECTRODE AND FLUX THEREFOR

Loulis G. Anastasiadis, Cleveland, Ohio, assignor to Una Welding, Incorporated, Cleveland, Ohio, a corporation of Delaware No Drawing. Application June 25, 1932
Serial No. 619,280

5 Claims. (Cl. 219—8)

My invention relates to welding electrodes and to a fluxing material therefor, and more particularly to a welding electrode comprising a base rod formed predominantly of aluminum and a coating associated therewith that is capable of stabilizing the arc characteristics of the electrode and improving the physical properties of the weld metal.

An object of my invention is to provide a welding electrode comprising a base rod formed predominantly of aluminum or an alloy formed predominantly of aluminum, having a coating associated therewith that has approximately the same or a slightly higher melting point than the base rod so that the flux and rod will melt at approximately the same rate, even though the welding current is varied.

Another object of my invention is to provide a welding electrode having a base rod composed predominantly of aluminum having a fluxing material associated therewith containing one or more ingredients which are capable of improving the physical properties of the weld metal during the welding operation, and one or more ingredients which are capable of causing the formation of a spongy slag so that it may readily be removed from the deposited weld metal.

A further object of my invention is to provide a welding electrode comprising a base rod formed predominantly of aluminum and a non-hygroscopic coating adherently associated therewith, that has substantially the same melting point as the base rod, that improves the arc characteristics of the electrode, and which is capable of refining the grain structure of the weld metal, so that a weld having improved physical properties may be produced.

Another object of my invention is to provide a welding electrode having a base rod formed predominantly of aluminum and a fluxing material adherently associated therewith that is non-hygroscopic, has good mechanical properties, and which does not crack or break away from the electrode during the welding operation.

Another object of my invention is to provide a welding electrode having a base rod formed predominantly of aluminum, and a coating material adherently associated therewith that is non-hygroscopic, improves the arc characteristics and the grain structure of the weld metal, and causes the formation of a spongy slag during the welding operation which may be readily removed from the surface of the weld metal.

A further object of my invention is to provide an improved flux for welding electrodes that has approximately the same or a slightly higher melting point than aluminum that is non-hygroscopic, that will adhere to aluminum or aluminum alloy base rods, and which contains one or more ingredients that have the property of refining the grain structure of aluminum.

A still further object of my invention is to provide a welding electrode having a flux associated therewith that has approximately the same or slightly higher melting point than the base rod and which contains one or more ingredients which have the property of causing the formation of a spongy slag so that it may be readily removed from the deposited weld metal.

In joining together aluminum pieces or building up worn surfaces formed of aluminum, or aluminum base alloys, it has been found impossible to utilize uncoated electrodes formed of aluminum in the arc welding process. This is caused by the fact that such metals oxidize very rapidly and since the oxide which is formed is electrically non-conductive, it is impossible to maintain the arc. In utilizing electrodes in the arc welding process in which the base rod is formed predominantly of aluminum, or aluminum alloys consisting predominantly of aluminum, such as aluminum-magnesium alloys, it has accordingly been the practice to provide the welding rod with a flux coating to improve the arc characteristics.

By my invention I have provided a welding electrode for use in arc welding in which a flux having an improved composition is associated with the rod in the form of a substantially uniform coating to improve the arc characteristics of the electrode and dissolve the oxides which are formed. The composition of my improved flux is such that it has approximately the same, or a slightly higher, melting point than the base rod, is non-hygroscopic, and has physical properties which enable it to adhere firmly to the base rod without cracking or breaking away therefrom during the welding operation. My improved flux contains one or more ingredients which are capable of improving the grain structure of the weld metal during the welding operation and one or more ingredients which causes the formation of a spongy slag which may be readily removed. When my improved flux is associated with a base rod formed of aluminum or aluminum alloys consisting predominantly of aluminum, such as aluminum-magnesium alloys, or aluminum-silicon alloys containing up to 5% silicon, the electrode not only has satisfactory arc characteristics, but a weld metal is produced which has improved physical properties.

In preparing my improved flux, a composition is provided which has substantially the same or a slightly higher melting point than aluminum, or in which the proportion of the ingredients may be varied to provide a composition that shall have substantially the same melting point as the aluminum, or alloy consisting predominantly of aluminum, which is utilized as the base rod. If the flux has a lower melting point than the base rod, it melts faster than the base rod during the welding operation, and as a result, the melting point of the base rod is increased and it is difficult to control the welding operations because it is necessary to move the electrode very rapidly over the base work to prevent burning holes in the base metal when the work metal is thin, or to prevent the formation of non-uniform beads when the work metal is comparatively thick. On the other hand, if the melting point of the flux is substantially higher than the base rod, a crater is produced which extinguishes the arc and a large amount of solid slag is deposited. I have therefore found it desirable to provide a flux having the same or a slightly higher melting point than the base metal rod.

As a basis for my improved flux, I utilize sodium or potassium chloride. I prefer to utilize potassium chloride because it has a comparatively low melting point and improves the arc characteristics of electrodes with which it is associated. For the purpose of improving the properties of the flux, a substantial amount of a compound having non-hygroscopic properties is associated with the potassium chloride, such as lithium fluoride or a mixture of lithium fluoride and sodium fluoride. Lithium fluoride or a mixture of lithium fluoride and sodium fluoride, however, has the property of raising the melting point of the flux and in order that the flux may have approximately the same or a slightly higher melting point than the base rod, an additional ingredient is added which has the property of lowering the melting point of the flux, such as sodium aluminum chloride. It will therefore be readily understood that by employing proper proportions of these ingredients, a flux having the desired melting point may be obtained. The melting point of the flux will, of course, depend upon the composition of the base rod or whether alloys are utilized.

As previously stated, I may utilize lithium fluoride alone as the binding agent. For economical reasons, however, I prefer to utilize a mixture of lithium fluoride and sodium fluoride. Both lithium fluoride and sodium fluoride are non-hygroscopic and act as binding agents. When attempts have been made to omit the lithium fluoride and substitute sodium fluoride in a sufficient amount to act as a binding agent and to provide the desired degree of non-hygroscopicity it has been found that the flux cracks during the welding operation. By utilizing a mixture of lithium fluoride and sodium fluoride, however, the necessary binding action and the desired degree of non-hygroscopicity is obtained at a low cost.

In addition, I also prefer to add to the flux a small percentage of a substance which is capable of causing the formation of a spongy slag, such as sodium or potassium dichromate, or a mixture of sodium and potassium dichromate. The dichromates are especially valuable for this purpose because they have a comparatively low melting point. Because of the oxidizing nature of the dichromates, however, they should be utilized in relatively small proportions. The dichromates, when utilized in the proper proportion, cause the formation of a spongy, loose slag that may be readily removed from the welding metal after it has been deposited. If too large a proportion of one or more of the dichromates is employed, however, it causes cupping of the weld metal.

In my researches on this subject, I have found that a satisfactory flux may be produced by utilizing a major proportion of potassium chloride, preferably in amounts ranging from 55% to 65%, to which 22% to 26% lithium fluoride, 10% to 14% sodium aluminum fluoride, 2% to 5% sodium fluoride, and .1% to 1% of either sodium or potassium dichromate, are added. If the sodium fluoride is omitted, the percentage of lithium fluoride may, of course, be increased. In such an event the lithium fluoride may be present in amounts ranging from approximately 23% to 30%. The essential purpose of both the lithium fluoride and sodium fluoride is to act as binders and to render the material non-hygroscopic. Since sodium fluoride is less expensive, I prefer to utilize as much of this ingredient as possible. If too much sodium fluoride is employed, however, it causes cracking of the flux during the welding operation. The alkali metal dichromate may, if desired, also be omitted. I have found it very desirable, however, to have either potassium or sodium dichromate, or a mixture of both of them, present as they aid in causing the formation of a spongy slag that may be readily removed from the surface of the deposited weld metal.

As a specific illustration, a flux having substantially the following composition has proved highly satisfactory for aluminum base rods formed of commercially pure aluminum:

| | Percent |
|---|---|
| Potassium chloride | 59.5 |
| Lithium fluoride | 23.5 |
| Sodium aluminum chloride | 12.5 |
| Sodium fluoride | 4.0 |
| Potassium dichromate | 0.5 |

From the foregoing examples, it will be particularly noted that the flux is composed principally of the halides of the alkali metals in such proportion that the flux will have approximately the same, or a slightly higher, melting point than the base rod and that the dichromate is only added in sufficient quantity to cause the formation of a spongy slag.

The flux may be mixed with water to the proper consistency and applied to the rod by any desirable method, such as by spraying, brushing, dipping or extrusion. I prefer the latter method because it enables the formation of a coating having a uniform thickness.

In utilizing my improved flux in producing a coated electrode having a base rod formed of aluminum, or an alloy consisting predominantly of aluminum, the thickness of the coating will, of course, vary in accordance with the thickness of the base rod. The coating should be of sufficient thickness to completely cover the base rod and prevent oxidation of the metal in the base rod, and should be uniformly distributed over the rod with the exception of a short distance from each end where the rod is left bare so that proper contact may be made with the work and the electrode. I have found that when a base rod is employed having a thickness of approximately $\frac{3}{32}$ of an inch, the thickness of the coating may vary from .025 to .035 of an inch. In general, it may be stated that the coating may be varied from .025 to .045 of an inch, depending upon the thickness of the base rod. If the coating is too thick, however, difficulty is experienced in maintaining the arc because in such cases the flux will not melt at the same rate as the base rod and a crater is produced. Moreover, when the coating is too heavy, an excessive amount of slag is formed which is also undesirable.

For base rods varying from 1/16 to 1/8 of an inch in diameter, the thickness of the coating may be varied from .025 to .04 of an inch. For rods having a larger diameter it has been found desirable to slightly increase the thickness of the flux coating in order to fully prevent the oxidation of the base rods. It will, of course, be understood that when the base rod is slightly larger in diameter, more heat is developed, thus insuring the melting of the slightly greater amount of a flux at approximately the same rate as the base metal. An electrode is thus produced which does not oxidize during the welding operation and one which will have good arc characteristics because the flux melts at approximately the same rate as the base rod.

In testing weld metal produced by my improved electrode in which commercial aluminum was utilized as a base rod, I have found that the weld metal has substantially the same mechanical properties, such as tensile strength and elongation, as commercial aluminum.

From the foregoing specification it will be seen that an improved electrode having a base rod formed of aluminum or aluminum alloys, is provided that has excellent arc characteristics and which is capable of producing a fine grain weld metal having improved physical properties.

It will also be seen that I have provided an improved flux which is non-hygroscopic and which adheres firmly to the base metal without cracking or breaking off in storage or during the welding operation, and which not only improves the arc characteristics of the electrode during the welding operation but causes a refinement in the grain structure.

It will also be apparent that because the flux has approximately the same or a slightly higher melting point than the base rod, and is distributed uniformly over the base rod, it will prevent oxidation of the base rod and improve the grain structure, but will not form a crater, thereby making it difficult to maintain the arc.

Furthermore, it will be noted that I have provided a welding electrode provided with a flux which has desirable physical properties and which is capable of producing a spongy slag which may be readily removed from the deposited weld metal.

It will be understood that my improved flux may also be applied to electrodes having a base rod formed of magnesium or alloys consisting predominantly of magnesium, such as magnesium-aluminum alloys. Magnesium has approximately the same melting point as aluminum and consequently a flux having substantially the same composition as utilized in association with aluminum or aluminum base alloys may be employed as a coating for magnesium or magnesium alloy base rods.

To those skilled in the art many modifications of and widely differing embodiments and applications of my invention will suggest themselves without departing from the spirit and scope thereof. My disclosure and the description herein are purely illustrative, and are not intended to be in any sense limiting.

What I claim is:

1. An electrode for arc welding comprising a base rod consisting predominantly of aluminum and a flux or coating applied uniformly to said rod, said flux comprising from 55% to 65% of potassium chloride, from 2% to 5% of sodium fluoride to cause the flux to adhere to the base rod without causing cracks in the flux during the welding operation, from 22% to 26% of lithium fluoride, and from 10% to 14% of sodium aluminum fluoride so that the melting point of the flux will be substantially the same or slightly higher than the melting point of the base rod.

2. An electrode for arc welding comprising a base rod consisting principally of aluminum and a flux coating therefor comprising 55% to 65% potassium chloride, 22% to 26% lithium fluoride, 10% to 14% sodium aluminum fluoride, .2% to 5% sodium fluoride and .1% to 1% of an alkali metal dichromate.

3. A welding electrode having a base rod consisting predominantly of aluminum and a flux associated therewith in the form of a substantially uniform coating having a thickness ranging from .025 to .045 of an inch, said flux comprising from 55% to 65% of potassium chloride, from 2% to 5% of sodium fluoride to cause the flux to adhere to the base rod without causing cracks in the flux during the welding operation, from 22% to 26% of lithium fluoride, and from 10% to 14% of sodium aluminum fluoride so that the melting point of the flux will be substantially the same or slightly higher than the base rod.

4. A welding electrode having a base rod consisting predominantly of aluminum and a flux associated therewith in the form of a substantially uniform coating having a thickness ranging from .025 to .045 of an inch, said flux comprising from 55% to 65% of potassium chloride, from 2% to 5% of sodium fluoride to cause the flux to adhere to the base rod without causing cracks in the flux during the welding operation, from 22% to 26% of lithium fluoride, from 10% to 14% of sodium aluminum fluoride so that the melting point of the flux will be substantially the same or slightly higher than the base rod, and from .1% to 1% of an ingredient having the property of causing the formation of a spongy slag which may be readily removed from the weld metal.

5. A welding electrode having a base rod consisting predominantly of aluminum and a flux associated therewith in the form of a substantially uniform coating having a thickness ranging from .025 to .045 of an inch, said flux comprising a mixture of alkali metal halides in such proportion that the flux will have a melting point substantially the same or slightly higher than the base rod, said flux comprising 55% to 65% potassium chloride, 22% to 26% lithium fluoride, 10% to 14% sodium aluminum fluoride, 2% to 5% sodium fluoride, and .1% to 1% of an alkali metal dichromate.

LOULIS G. ANASTASIADIS.